United States Patent Office 2,824,861
Patented Feb. 25, 1958

2,824,861

QUATERNARY COMPOUNDS

John P. Conbere and Firmin P. Reed, Providence, R. I., assignors to Arnold, Hoffman & Co., Incorporated, Providence, R. I., a corporation of Rhode Island No Drawing. Application May 19, 1955
Serial No. 509,676

16 Claims. (Cl. 260—89.5)

The present invention relates to new quaternary ammonium salts of certain amino ethers of polyglycol esters of acrylic acids, polymers of such esters and textiles treated with such polymers to impart antistatic properties thereto.

One disadvantage of textile fibers and particularly of fabrics prepared from synthetic hydrophobic materials, and of all textile fibers treated with conventional resin finishes, is that they tend to develop a static electrical charge. This charge is objectionable during the manufacture of the textile and in the finished garment. During manufacture the static charge on the fibers or fabric interferes with their convenient handling during spinning, reeling, weaving and the like. Finished articles which are designed to drape like cotton or wool articles fail to do so properly due to their electrostatic charge and often cling uncomfortably to the wearer. Furthermore, such textiles tend to collect dust and lint, and the electric discharge itself is bothersome.

Many treating agents have been proposed to impart anti-static effects to textiles of this type. However, none of the proposed agents is entirely satisfactory, either because of their ineffectiveness or their lack of resistance to washing and dry cleaning. Many of these anti-static agents are effectively transferred to the textile materials only with great difficulty.

It is an object of this invention to prepare new quaternary monomers.

A further object is to prepare new quaternary polymers.

Another object is to provide textile fibers and fabrics with a coating of an anti-static agent.

An additional object is to apply an anti-static agent to a textile material in a simple and economical manner.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained through the preparation and polymerization of new monomers of quaternary ammonium salts of dialkyl amino alkyl ethers of ethylene glycol and polyethylene glycol as more fully defined below.

The polymeric quaternary ammonium esters of the glycol derivatives possess the unique characteristic of imparting antistatic properties to textile fabrics. The polymers can be fixed to the fabrics by after treatment with a soap of a fat acid, long chain alkyl and alkenyl sulfate salts, aralkyl sulfate salts or alkyl, aralkyl or alkaryl sulfonate salts. The polymeric products of the present invention and the long chain anions from the after treatment form a water insoluble adduct which resists removal by standard wash methods, and thus imparts a permanent antistatic effect to the treated fabric.

The monomeric materials of the present invention include compounds having the formula $$\left[ CH_2=\overset{R_1}{\underset{|}{C}}-\overset{O}{\underset{\|}{C}}O(CH_2CH_2O)_n(CH_2)_z-N\overset{R_2}{\underset{R_4}{\diagdown}}R_3 \right]^+ X^-$$

wherein $R_1$ is hydrogen or methyl, $R_2$ is an alkyl group containing one to four carbon atoms, $R_3$ is an alkyl group containing one to four carbon atoms or $R_2$ and $R_3$ can be together joined to form with the nitrogen atom a heterocyclic ring, the hetero atoms of said ring being nitrogen or nitrogen and oxygen, e. g., a piperidine, a piperazine or morpholine ring, $R_4$ is methyl or ethyl, $n$ is an integer from one to five inclusive, $z$ is an integer from two to four inclusive and X is an anion.

Typical examples of compounds coming within the above formula are the N-methyl methyl sulfate of the methacrylate ester of $\beta$-diethylaminoethyl ether of ethylene glycol, N-methyl p-toluene sulfonate of the methacrylate ester of $\beta$-diethylaminoethyl aminoethyl ether of ethylene glycol, N-ethyl ethyl sulfate of the methacrylate ester of $\beta$-diethylaminoethyl ether of ethylene glycol, N-ethyl bromide of the methacrylate ester of $\beta$-diethylaminoethyl ether of ethylene glycol, N-methyl methyl sulfate of the methacrylate ester of $\beta$-diethylaminoethyl ether of diethylene glycol, N-methyl methyl sulfate of the methacrylate ester of $\beta$-diethylaminoethyl ether of triethylene glycol, N-methyl methyl sulfate of the methacrylate ester of the $\beta$-diethylaminoethyl ether of tetraethylene glycol, N-methyl methyl sulfate of the methacrylate ester of $\beta$-diethylaminoethyl ether of pentaethylene glycol, N-methyl methyl sulfate of the acrylate ester of $\beta$-diethylaminoethyl ether of ethylene glycol, N-methly methyl sulfate of the methacrylate ester of $\beta$-dimethylamino ethyl ether of ethylene glycol, N-methyl methyl sulfate of the methacrylate ester of $\beta$-dibutylaminoethyl ether of ethylene glycol, N-methyl methyl sulfate of the methacrylate ester of $\beta$(1-piperidino) ethyl ether of ethylene glycol, N-methyl methyl sulfate of the methacrylate ester of $\beta$-diethylaminobutyl ether of ethylene glycol, N-methyl methyl sulfate of the methacrylate ester of $\beta$-methyl butylaminoethyl ether of ethylene glycol, N-methyl methyl sulfate of the methacrylate ester of $\beta$(1-morpholino) ethyl ether of ethylene glycol.

In the formula X is preferably the anion of a strong acid and more specifically is a halide such as chloride, bromide or iodide or is the anion of a strong sulfur acid, e. g., sulfate, methyl sulfate, ethyl sulfate, and other alkane sulfates, p-toluene sulfonate, butyl sulfate, m-xylene sulfonate, benzene sulfonate and other aryl sulfonates.

The polymerization of the monomers can be carried out in the presence of conventional free radical type catalysts in aqueous media. Typical catalysts include peroxy compounds such as ammonium persulfate, benzoyl peroxide, lauroxyl peroxide, acetyl peroxide, hydrogen peroxide, sodium persulfate, potassium persulfate, azo compounds having the azo, —N=N—, group acyclic joined to discrete non-aromatic carbons at least one of which is a tertiary carbon atom in turn joined to a carbon atom whose remaining valences are satisfied by oxygen and/or nitrogen (as in Hunter, U. S. Patent 2,471,959) such as azodiisobutyronitrile, etc. The amount of catalyst empolyed is generally small, e. g., 0.01–5% by weight of the polymerizable monomer. The monomers can be homopolymerized or copolymerized with each other or other copolymerizable monomers.

The monomeric quaternary ammonium salts are soluble in water and the polymers are obtained in the form of an aqueous syrup. The syrup can be dried to give a semi-solid sticky mass which redissolves in water only with difficulty. Preferably, however, the aqueous syrup without drying is employed directly to treat the textile fiber or fabric.

Polymerization can be carried out by treating an aqueous monomer solution with the catalyst or by adding monomer to a solution of the desired catalyst. The polymerization can be carried out at from about 4° C. to 100° C.

In order to prevent unduly high polymerization, various conventional polymerization inhibitors, such as aromatic amines and alkylphenols, can be present both during the formation of the monomer and formation of the polymer. On the other hand, it is possible by using very small amounts of catalyst and by eliminating the inhibitor to produce more highly polymeric products in the form of a resin gel. The resin gels can be used as anion exchange resins.

However, the preferred materials are the aqueous syrups which can be applied as such as antistatic agents to textile materials, including fibers, yarns, threads and fabrics formed from nylon (polymeric hexamethylene adipamide, epsilon caprolactam polymer, and other synthetic linear superpolyamides, etc.), cellulose acetate, and other cellulose esters, polyacrylonitrile, polyethylene terephthalate, polyvinylidene chloride, and other fabrics which tend to accumulate static electric charges.

In the preferred method of operation, the fabric is padded through a dilute aqueous solution of the quaternary ammonium polymer so as to pick up about 0.1% to 1.0% of the quaternary compound. The fabric is frame-dried and then rinsed with a dilute solution of the soap or sulfur containing detergent so as to pick up 0.75% to .90% of the latter, and is then dried again to give the final antistatic material.

As the soap or other detergent, there can be used water soluble salts such as sodium stearate, potassium stearate, ammonium stearate, sodium oleate, potassium oleate, the potassium soap of coconut fatty acids, sodium laurate, sodium oleyl sulfate, sodium octyl sulfate, sodium hexadecenyl sulfate, sodium dodecyl sulfate, potassium dodecyl sulfate, sodium lorol sulfate (this is a mixture of the sodium salts of alkyl sulfates in which the alkyl groups have from 10 to 14 carbon atoms with an average of around 12 carbon atoms), N-diethylcyclohexyl ammonium dodecyl sulfate, sodium salt of the sulfates of mixed dodecyl-tetradecyl alcohols condensed with about one mol of ethylene oxide, ammonium dodecyl sulfate, sodium cetyl sulfate, potassium cetyl sulfate, sodium salt of mixed $C_{10}$–$C_{20}$ alkenyl sulfates (alcohols derived from the sodium reduction of sperm oil), sodium salt of the sulfate of octadecenyl alcohol condensed with about one mol of ethylene oxide, sodium dodecane sulfonate, potassium octadecane sulfonate, sodium alkyl benzene sulfonates wherein the alkyl group has an average chain length of 10, 14 or 18 carbon atoms, e. g., sodium dodecylbenzene sulfonate, sodium phenyl hexane sulfonate, sodium octyl phenylbutane sulfonate, salts of alkylsulfosuccinates, e. g., sodium dioctylsulfosuccinate and sodium dihexylsulfosuccinate arylalkyl ether sulfonates, e. g., the sodium salt of the octylphenyl ether of hydroxyethoxy ethanesulfonic acid, sodium monobutyl phenylphenol sulfonate, etc. In general, the detergent should have at least eight carbon atoms.

The starting aminoethers for preparing the new quaternary compounds can be prepared by conventional processes in the art, a preferred method is that described by Headle et al. in Jour. Amer. Chem. Soc., vol. 55, pages 1066–1068.

For convenience, the nomenclature system throughout the specification and claims is based on a glycol ether system. It is evident that the new compounds are ethers and the present polymeric quaternary compounds are the first polymeric acrylic acid esters having both a quaternary ammonium group and an ether group which have proven to be effective antistatic agents.

The dialkylaminoalkylether of the alkylene glycol or the β(1-piperidino) alkyl ether of the alkylene glycol is then reacted with methyl acrylate or methyl methacrylate or the corresponding acyl halide to form the desired tertiary amino group containing ester by ester interchange or by splitting out hydrogen halide. The tertiary amino alkyl ether group containing esters are converted to quaternary ammonium salts by reacting with conventional alkylating agents such as lower alkyl sulfates, e. g., dimethyl sulfate, diethyl sulfate, lower alkyl halides, e. g., methyl iodide, ethyl chloride, ethyl bromide, methyl bromide, trialkyl phosphates, e. g., triethyl phosphate, trimethyl phosphate, trialkyl phosphites, e. g., triethyl phosphite, alkyl esters of alkyl or aryl sulfonic acids, e. g., methyl hexane sulfonate, methyl p-toluene sulfonate, ethyl p-toluene sulfonate, ethyl benzene sulfonate, etc. The resulting quaternary ammonium salts are soluble in water.

In the following examples and throughout the specification and claims, all parts are parts by weight unless otherwise indicated.

PREPARATION OF THE TERTIARY AMINOALKYL-ETHERS OF THE ALKYLENE GLYCOLS

The esters formed in Examples I through IX are water insoluble.

Example I

Methacrylate ester of β-diethylaminoethyl ether of ethylene glycol.

A flask fitted with a copper gauze packed fractionating column with a distilling head arranged for controlled reflux was charged with 161 g. β-diethylaminoethyl ether of ethylene glycol, 30 g. phenyl β-naphthylamine, 20 g. aluminum isopropoxide and 400 ml. methyl methacrylate. The mixture was heated under nitrogen until it refluxed, and the methanol formed from the methyl methacrylate by ester interchange distilled. After the theoretical amount of methanol had been collected, the charge was cooled and 150 ml. of concentrated hydrochloric acid in 500 ml. of water was added with stirring. The aqueous layer was extracted with three 500 ml. portions of ether, the emulsions formed being broken with saturated sodium chloride solution. The aqueous layer was made alkaline with 80 g. sodium hydroxide dissolved in 300 ml. of water. One gram of phenyl β-naphthylamine was added, and the mixture extracted with three 500 ml. portions of ether. The ether layers from the alkaline extraction were combined, washed with 75 ml. of saturated sodium chloride solution, dried over sodium sulfate and the solvent distilled. The residue was distilled at reduced pressure to yield the product, B. P. 121–5° C. at 4 mm., $n_D^{25}$ 1.4470.

*Analysis.*—Calcd. for $C_{12}H_{23}NO_3$: N, 6.12. Found: N, 6.23.

Example II

Methacrylate ester of β-diethylaminoethyl ether of diethylene glycol.

A charge of 205 g. β-diethylaminoethyl ether of diethylene glycol, 30 g. phenyl β-naphthylamine, 20 g. aluminum isopropoxide and 400 ml. methyl methacrylate was treated in the same manner as described in Example I. The product boiled at 135° C. at .5 mm., $n_D^{25}$ 1.4522.

*Analysis.*—Calcd. for $C_{14}H_{27}NO_4$: N, 5.13. Found: N, 5.26.

Example III

Methacrylate ester of β-diethylaminoethyl ether of triethylene glycol.

A charge of 249 g. β-diethylaminoethyl ether of triethylene glycol, 30 g. phenyl β-naphthylamine, 20 g. aluminum isopropoxide and 400 ml. methyl methacrylate was treated in the same manner as described in Example I. The product boiled at 114–130° C. at 0.1 mm., $n_D^{25}$ 1.4589.

Analysis.—Calcd. for $C_{16}H_{31}NO_5$: N, 4.42. Found: N, 4.55.

Example IV

Methacrylate ester of β-diethylaminoethyl ether of tetraethylene glycol.

A solution of 29.3 g. of β-diethylaminoethyl ether of tetraethylene glycol in 100 ml. benzene was dried by azeotropic distillation. The solution was cooled and 13 g. of methacrylyl chloride slowly added, maintaining the temperature at less than 40° C. The reaction mixture was allowed to stand overnight at room temperature. After shaking this mixture with 25 ml. 6 N sodium hydroxide, the benzene layer was washed with sodium chloride solution and dried over sodium sulfate. The solvent was distilled at reduced pressure to yield the product as a heavy syrup.

Example V

Methacrylate ester of β-diethylaminoethyl ether of pentaethylene glycol.

A solution of 67 g. of β-diethylaminoethyl ether of pentaethylene glycol was treated with 24 g. of methacrylyl chloride in the same manner as described in Example IV. The product was obtained as a heavy syrup.

Example VI

Acrylate ester of β-diethylaminoethyl ether of ethylene glycol.

A charge of 161 g. β-diethylaminoethyl ether of ethylene glycol, 400 ml. benzene, 17 g. Ionol (2,6 ditertiary butyl-4-methyl phenol) and 72 g. methyl acrylate was heated in a flask fitted with a copper gauze packed fractionating column and a distilling head arranged for partial take-off, until the head temperature reached 80° C. The charge was cooled to 80° C. and a solution of 0.3 g. sodium hydroxide in 6.6 ml. methanol added over a period of two hours with continual distillation of the benzene-methanol azeotrope. The distillation was continued until the head temperature reached 79° C. and remained there under total reflux. The charge was cooled and shaken with 200 ml. of water. After separating the layers, the organic layer was dried with sodium sulfate and the solvent distilled. The residue was distilled to yield the product, B. P. 112–114° C. at 5 mm. The product had a tendency to polymerize in the distillation receiver.

Example VII

Methacrylate ester of β-dimethylaminoethyl ether of ethylene glycol.

A solution of 66.5 g. of β-dimethylaminoethyl ether of ethylene glycol in 100 ml. benzene was treated with 52 g. methacrylyl chloride in the same manner as described in Example IV. The product was distilled at reduced pressure, B. P. 105–108° C. at 4 mm.

Example VIII

Methacrylate ester of β-dibutylaminoethyl ether of ethylene glycol.

A solution of 7.8 g. dibutylaminoethyl ether of ethylene glycol in 25 ml. benzene was treated with 4.0 g. methacrylyl chloride in the same manner as described in Example IV. The product was a syrup.

Example IX

Methacrylate ester of β(1-piperidino)ethyl ether of ethylene glycol.

A solution of 17.3 g. β(1-piperidino)ethyl ether of ethylene glycol in 50 ml. benzene was treated with 12 g. methacrylyl chloride in the same manner as described in Example IV. The product was isolated as a viscous liquid.

The quaternary ammonium compounds formed in Examples X through XXI are all water soluble.

QUATERNARY AMMONIUM COMPOUNDS

Example X

N-methyl methylsulfate of the methacrylate ester of β-diethylaminoethyl ether of ethylene glycol.

To 76.3 g. of the methacrylate ester of β-diethylaminoethyl ether of ethylene glycol containing 1% Topanol A (2,4 dimethyl-6-tertiary butyl phenol) was slowly added 42. g. dimethyl sulfate with vigorous stirring. The temperature was maintained at 50–55° C. during the addition of the first two-thirds of the dimethyl sulfate and at 55–60° C. during the addition of the final third. The reaction mixture was heated at 60° C. for ten minutes after the addition was completed. The product was obtained as a clear viscous liquid.

Analysis.—Calcd. for $C_{14}H_{29}NO_7S$: N, 3.95; S, 9.02. Found: N, 4.02; S, 9.18.

Example XI

N-methyl p-toluene-sulfonate of the methacrylate ester of β-diethylaminoethyl ether of ethylene glycol.

Methyl p-toluenesulfonate (9.3 g.) was slowly added to 11.45 g. of the methacrylate ester of β-diethylaminoethyl ether of ethylene glycol which was stirred and maintained at 50–60° C. After the addition was completed, the reaction mixture was heated for ten minutes at 50–60° C.

Analysis.—Calcd. for $C_{20}H_{33}NO_6S$: N, 3.38; S, 7.73. Found: N, 3.41; S, 7.73.

Example XII

N-ethyl ethylsulfate of the methacrylate ester of β-diethylaminoethyl ether of ethylene glycol.

11.5 g. of the methacrylate ester of β-diethylaminoethyl ether of ethylene glycol was treated with 7.7 g. diethyl sulfate by the same procedure as described in Example IX. The product was obtained as a viscous liquid which was soluble in water.

Example XIII

N ethyl bromide of the methacrylate ester of β-diethylaminoethyl ether of ethylene glycol.

A solution of 15 g. ethyl bromide and 25.7 g. of the methacrylate ester of β-diethylaminoethyl ether of ethylene glycol in 25 ml. of anhydrous ether was allowed to stand at room temperature for two weeks. The ether layer was decanted and the lower syrupy layer triturated with anhydrous ether. The occluded solvent was removed under reduced pressure. The product was obtained as a viscous liquid.

Example XIV

N-methyl methylsulfate of the methacrylate ester of β-diethylaminoethyl ether of diethylene glycol.

109.2 g. of the methacrylate ester of β-diethylaminoethyl ether of diethylene glycol was treated with 50.5 g. dimethyl sulfate by the same procedure as described in Example IX. The product was obtained as a clear viscous liquid which was soluble in water.

Example XV

N-methyl methylsulfate of the methacrylate ester of β-diethylaminoethyl ether of triethylene glycol.

106 g. of the methacrylate ester of β-diethylaminoethyl ether of triethylene glycol was treated with 42.5 g. dimethyl sulfate by the same procedure as described in Example IX. The product was obtained as a viscous liquid which was soluble in water.

Example XVI

N-methyl methylsulfate of the methacrylate ester of the β-diethylaminoethyl ether of tetraethylene glycol.

33.2 g. of the methacrylate ester of β diethylaminoethyl ether of tetraethylene glycol was treated with 11.6 g. dimethylsulfate by the same procedure as described in Example IX. The product was obtained as a viscous liquid which was soluble in water.

Example XVII

N-methyl methylsulfate of the methacrylate ester of β-diethylaminoethyl ether of pentaethylene glycol.

60 g. of the methacrylate ester of β-diethylaminoethyl ether of pentaethylene glycol was treated with 18.7 g. dimethylsulfate by the same procedure as described in Example IX. The viscous product was soluble in water.

Example XVIII

N-methyl methylsulfate of the acrylate ester of β-diethylaminoethyl ether of ethylene glycol.

13.1 g. of the acrylate ester of β-diethylaminoethyl ether of ethylene glycol was treated with 7.7 g. dimethylsulfate by the same procedure as described in Example XI. The product was obtained as a viscous liquid which was soluble in water.

Example XIX

N-methyl methylsulfate of the methacrylate ester of β-dimethylaminoethyl ether of ethylene glycol.

17.4 g. of the methacrylate ester of β-dimethylaminoethyl ether of ethylene glycol was treated with 10.9 g. dimethylsulfate by the procedure described in Example IX to yield a viscous liquid which was soluble in water.

Example XX

N-methylsulfate of the methacrylate ester of β-dibutylaminoethyl ether of ethylene glycol.

A solution of 8.8 g. of the methacrylate ester of β-dibutylaminoethyl ether of ethylene glycol in 10 ml. benzene was heated to reflux and treated with 3.9 g. dimethyl sulfate. The reaction mixture was refluxed for thirty minutes after the addition was completed. The solvent was removed at reduced pressure to yield a water soluble syrup.

Example XXI

N-methyl methylsulfate of the methacrylate ester of β(1-piperidino)ethyl ether of ethylene glycol.

24.1 g. of the methacrylate ester of β(1-piperidino)ethyl ether of ethylene glycol was treated with 12.6 g. dimethylsulfate by the procedure described in Example IX to yield a viscous liquid which was soluble in water.

Example XXII

N-methyl methylsulfate of the methacrylate ester of γ-dimethylaminopropyl ether of diethylene glycol.

Dimethyl sulfate (100 g.) was added slowly to a refluxing solution of 206 g. of the methacrylate ester of γ-dimethylaminopropyl ether of diethylene glycol in 259 g. benzene during thirty minutes. The mixture was stirred at the reflux temperature for an additional thirty minutes. The reaction mixture was cooled to 45° C. and 650 ml. water added. The whole was stirred for fifteen minutes, transferred to a separatory funnel and the layers allowed to separate. The aqueous layer contained the desired quaternary ammonium compound.

POLYMERS

The polymers described in each of Examples XXIII through XXXV were obtained in the form of aqueous solutions and could be dried to sticky semi-solid masses which redissolved in water only with difficulty.

Example XXIII

Polymer of N-methyl methylsulfate of methacrylate ester of β-diethylaminoethyl ether of ethylene glycol.

Nitrogen was bubbled through a solution of 104.9 g. of the monomeric quaternary ammonium salt in 230 ml. water. The solution was heated to 95° C. and a solution of 1.04 g. ammonium persulfate in 15 ml. water slowly added thereto. The temperature spontaneously rose to 98° C. and the mixture was maintained at 90°-95° C. for an additional fifteen minutes. The solution changed from a thin watery consistency to a heavy thick syrup during the reaction.

Example XXIV

Polymer of N-methyl methylsulfate of methacrylate ester of β-diethylaminoethyl ether of diethylene glycol.

A solution of 149 g. of the monomeric quaternary ammonium salt in 333 ml. water was treated with a solution of 1.5 g. ammonium persulfate in 15 ml. water by the procedure described in Example XXII to yield a polymeric solution with a greater viscosity than the monomeric solution.

Example XXV

Polymer of N-methyl methylsulfate of the methacrylate ester of β-diethylaminoethyl ether of triethylene glycol.

A solution of 16.1 g. of the monomeric quaternary ammonium salt in 35 ml. water was treated with 0.16 g. ammonium persulfate in 3 ml. water by the procedure described in Example XXII to yield a polymeric solution with greater viscosity than the initial solution.

Example XXVI

Polymer of N-methyl methylsulfate of the methacrylate ester of β-diethylaminoethyl ether of tetraethylene glycol.

A solution of 21 g. of the monomeric quaternary ammonium salt in 45 ml. of water was treated with a solution of 0.2 g. ammonium persulfate in 3 ml. water by the procedure described in Example XXII. A more viscous solution resulted after the reaction had occurred.

Example XXVII

Polymer of N-methyl methylsulfate of the methacrylate ester of β-diethylaminoethyl ether of pentaethylene glycol.

A solution of 14.0 g. of the monomeric quaternary ammonium salt in 50 ml. of water was treated with a solution of 0.14 g. ammonium persulfate in 6 ml. of water by the procedure described in Example XXII to yield a more viscous product.

Example XXVIII

Polymer of N-methyl p-toluenesulfonate of the methacrylate ester of β-diethylaminoethyl ether of ethylene glycol.

A solution of 14.0 g. of the monomeric quaternary ammonium salt in 31 ml. water was treated with a solution of 0.14 g. ammonium persulfate in 1.7 ml. water as described in Example XXII. The resultant solution of the polymer was thick and syrupy.

Example XXIX

Polymer of N-ethyl ethylsulfate of the methacrylate ester of β-diethylaminoethyl ether of ethylene glycol.

A solution of 15.3 g. of the monomeric quaternary ammonium salt in 33.7 ml. water was treated with a solution of 0.15 g. ammonium persulfate in 2 ml. water as described in Example XXII. The product was obtained as a viscous solution.

Example XXX

Polymer of N-ethyl bromide of the methacrylate ester of β-diethylaminoethyl ether of ethylene glycol.

A solution of 7.5 g. of the monomeric quaternary ammonium salt in 17 ml. water was treated with 0.075 g. ammonium persulfate in 0.5 ml. water as described in Example XXII to yield a viscous solution of the polymer.

Example XXXI

Polymer of N-methyl methylsulfate of the acrylate ester of β-diethylaminoethyl ether of ethylene glycol.

A solution of 16.2 g. of the monomeric quaternary ammonium salt in 37 ml. of water was treated with a solution of 0.16 g. ammonium persulfate in 0.8 ml. of water by the procedure described in Example XXII. The resultant solution of the polymer was thick and syrupy.

Example XXXII

Polymer of N-methyl methylsulfate of the methacrylate ester of β-dimethylaminoethyl ether of ethylene glycol.

A solution of 22.3 g. of the monomeric quaternary ammonium salt in 50 ml. water was treated with 0.2 g. ammonium persulfate dissolved in 4.4 ml. water as described in Example XXII. A viscous polymeric product was obtained.

Example XXXIII

Polymer of N-methyl methylsulfate of the methacrylate ester of β-dibutylaminoethyl ether of ethylene glycol.

A solution of 12.7 g. of the monomeric quaternary ammonium salt in 29 ml. water was treated with a solution of 0.2 g. ammonium persulfate in 1 ml. water by the procedure described in Example XXIII. The resultant solution of the polymer was syrupy.

Example XXXIV

Polymer of N-methyl methylsulfate of the methacrylate ester of β(1-piperidino) ethyl ether of ethylene glycol.

A solution of 15 g. of the monomeric quaternary ammonium salt in 27 ml. water was treated with 0.15 g. ammonium persulfate in 3 ml. water by the procedure described in Example XXIII to give a viscous solution of the polymer.

The polymers of the present invention are of particular value as antistatic agents and the following example is directed to such use.

Example XXXV

Polymer of N-methyl methylsulfate of the methacrylate ester of γ-dimethylamino propyl ether of diethylene glycol.

Nitrogen was passed through a solution of 29 g. of the quaternary ammonium compound in 71 ml. water containing .05 g. "Topanol A." The solution was heated to 95° with stirring and 0.75 ml. of a 10% aqueous solution of ammonium persulfate was added. An exothermic reaction ensued and after maintaining the temperature at 95° or above for fifteen minutes a very viscous product was obtained.

Example XXXVI

The aqueous solution of the polymeric N-methyl methylsulfate of the methacrylate ester of β-diethylaminoethyl ether of ethylene glycol of Example XXIII was diluted to give a ⅓% aqueous solution of the polymer and the solution heated to 60° C. Nylon (polymeric hexamethylene adipamide) 200-taffeta was padded with this solution. Pick-up was approximately 80%. The material was frame dried at 80° C. for 10 minutes and then rinsed with a 1% solution of sodium oleyl sulfate to retain slightly less of the sodium oleyl sulfate than of the polymer. The fabric was again frame dried at 80° C. to give a material which had superior antistatic properties and whose antistatic properties showed a high resistance to laundering.

The temperature of the padding, rinsing and drying operations are not critical.

In place of the nylon of Example XXXVI, there can be treated any other polymer subject to accumulations of static electricity. In place of the sodium oleyl sulfate of Example XXXVI, there can be employed any other anionic detergent, such as the soaps of fat and fatty acids and sulfate and sulfonate detergents previously set forth.

We claim:

1. A compound having the formula:

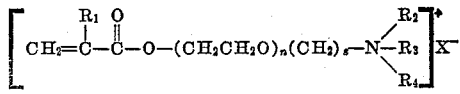

wherein $R_1$ is selected from the group consisting of hydrogen and methyl, $R_2$ and $R_3$ are selected from the group consisting of (a) alkyl groups having 1 to 4 carbon atoms and (b) are joined together to form with the nitrogen atom a heterocyclic ring selected from the group consisting of

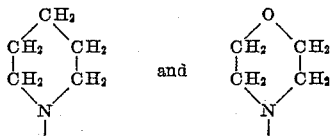

$R_4$ is selected from the group consisting of methyl and ethyl, $n$ is an integer from 1 to 5 inclusive, $z$ is an integer from 2 to 4 inclusive and X is an anion.

2. Polymers of the compounds of claim 1.

3. The salt of an acid with the trialkyl aminoalkylene ether of an ethylene glycol ester of methacrylic acid, two of said alkyl groups having up to 4 carbon atoms and the third alkyl group having up to two carbon atoms, said ethylene glycol group having up to 5 ethylene oxide units.

4. Polymers of the compounds of claim 3.

5. The salt of an acid with the trialkylaminoalkylene ether of an ethylene glycol ester of acrylic acid, two of said alkyl groups having up to 4 carbon atoms and the third alkyl group having up to two carbon atoms, said ethylene glycol group having up to 5 ethylene oxide units.

6. Polymers of the compounds of claim 5.

7. N-methyl methyl sulfate of the methacrylate ester of β-diethylaminoethyl ether of ethylene glycol.

8. N-methyl P-toluenesulfonate of the methacrylate ester of β-diethylaminoethyl ether of ethylene glycol.

9. N-methyl methyl sulfate of the methacrylate ester of β-diethylaminoethyl ether of triethylene glycol.

10. N-methyl methyl sulfate of the acrylate ester of β-diethylaminoethyl ether of ethylene glycol.

11. A polymer of the compound of claim 7.

12. A polymer of the compound of claim 8.

13. A polymer of the compound of claim 9.

14. A polymer of the compound of claim 10.

15. A compound according to claim 1, in which the anion is a sulfonate ion.

16. A compound according to claim 1, in which the anion is a sulfate ion.

References Cited in the file of this patent

UNITED STATES PATENTS

| | | |
|---|---|---|
| 2,138,763 | Graves | Nov. 29, 1938 |
| 2,693,430 | Cross | Nov. 2, 1954 |
| 2,694,688 | Hughes | Nov. 16, 1954 |
| 2,723,246 | Boyd | Nov. 8, 1955 |